3,278,333
ADHESION OF SHAPED POLYESTER STRUCTURES TO RUBBER ELASTOMERS BY USE OF ISOCYANATE
Rudolf Titzmann, Bobingen, near Augsburg, Karl Röhsler, Augsburg, and Rudolf Zinsmeister, Bobingen, near Augsburg, Germany, assignors to Farbwerke Hoechst Aktiengesellschaft vormals Meister Lucius & Brüning, Frankfurt am Main, Germany, a corporation of Germany
No Drawing. Filed Nov. 22, 1963, Ser. No. 325,763
Claims priority, application Germany, Nov. 24, 1962, F 38,407
9 Claims. (Cl. 117—138.8)

The present invention provides a process for the treatment of shaped structures made of polyesters to improve the adhesion thereof to rubber elastomers. The term rubber elastomer as used throughout the specification and claims is intended to be used in its generic sense to include rubber substitutes, natural rubber, compounded rubber, modified rubber or synthetic rubber and similar materials.

Fibers, filaments, monofils, bristles, foils and other shaped structures of linear polyesters containing six-membered carbocycles, in particular polyethylene terephthalate, adhere very poorly to the surfaces of other materials or the same material. The poor adhesion to rubber and other elastomers is especially disadvantageous when the structure made thereof are subjected to continuous dynamic strain since if the adhesion between the elastomer and the polyester is loosened the textile lining material can be destroyed by chafing, or, in the case of local overheating, by melting. Thus, it is of decisive importance, for example, that the lining and reinforcement material used in tires, cone belts, conveyer bands and the like should adhere very well to the elastomers.

Textile materials made of substances whose molecules possess enough active groups, for example, polyamides, adhere relatively strongly to rubber elastomers, so that for imparting on such materials an affinity for rubber an aqueous impregnation mixture consisting of, for example, a resorcinol-formaldehyde/latex dispersion, is sufficient. Polyester molecules, however, are not sufficiently active, so that the desired adhesion can be achieved only by the addition of other substances, in particular polyisocynates, to the impregnating mixture.

Various impregnation processes have been proposed to improve the adhesion of elastomers to polyester textile material. Most of these processes used hitherto are two-bath processes, that is to say the textile material is impregnated in two different baths, one being an aqueous dispersion and the other likewise being an aqueous dispersion or a solution in an organic solvent. Thus, for example, in the first stage, the polyester material is impregnated with a latex mixture consisting of a latex of natural or synthetic rubber with addition or resorcinol-formaldehyde, and in the second bath, it is treated with the solution of a polyisocyanate, for example, triphenylmethane-4,4',4''-triisocyanate, in an organic solvent. After each impregnation, it is necessary to dry the material. Furthermore, it is also known to use the impregnating baths in reversed order.

These known two-bath processes provide good adhesion between the polyester and the rubber, but they suffer from disadvantages of such importance that the use of polyester textiles as lining material for reinforcing rubber products has hitherto not attained the scope which this synthetic material merits in view of its good textile properties. The most important disadvantage of these processes is that they involve high expenses with regard to apparatus and time. Furthermore, the solvent vapors which form during operation and the toxic properties of the used free isocyanates constitute further disadvantages.

In another known two-bath process, the impregnation in the first stage is carried out with an aqueous dispersion the main component of which is a copolymer based on polyvinylidene chloride, while the impregnation in the second bath is carried out with an aqueous latex system. This process too involves the disadvantage that the treated material must be twice immersed and dried intermediately and after the operation.

Furthermore, there have been proposed single-bath processes with, for example, an immersion bath containing a rubber elastomer or a vulcanisable rubber-mixture, dissolved or dispersed in an organic solvent or mixture of solvents with the addition of a polyisocyanate soluble in this solvent. A serious disadvantage of this process is that the bath is stable for a few hours only, as the bath undergoes gradual gelation. Another disadvantage is that vapors of the organic solvents are formed during the drying which are toxic so that they must be withdrawn and recovered, to enable economic operation.

Furthermore, there has been proposed the use of a chemically masked isocyanate or a compound splitting off isocyanate in a single-bath process, so that the otherwise compulsory use of organic solvents can be dispensed with and the operation can be carried out in an aqueous medium. Thus, for example, a phenol masked diphenylmethane-4,4'-diisocyanate is added to the aqueous latex mixture. When the drying of the thus impregnated material is complete, the material must be further heated to cause thermal separation of the isocyanate derivative, thus enabling the isocyanate set free to react with the polyester and the components of the latex mixture. This process involves the disadvantage that expensive masking substances must be evaporated and withdrawn during the splitting process in order to continuously shift the reaction equilibrium in favor of the free isocyanate and thus to secure an almost complete reaction. Withdrawal of the vapors is necessary because of their more or less great toxicity. In addition thereto, the process involves the risk of damage to the textile material by the mostly phenolic vapors that form at the high splitting temperatures of more than 200° C. which are in most cases required.

It is, therefore, an object of the present invention to provide a single-bath process for improving the adhesion of shaped structures of linear polyesters to rubber or other elastomers in which the above-cited disadvantages are avoided. The present invention is based on the finding that the polyisocyanate required for a single-bath process in an aqueous medium cannot only be protected from the action of the water by chemical blocking, but also be mechanically enveloping the small isocyanate particles with a water-insoluble, film-forming substance. Thus, we have found that the adhesion of shaped structures such as fibers, filaments, monofils, bristles, foils, fabrics and knit fabrics made of linear polyesters, especially of polyethylene terephthalate, to rubber or to other elastomers can be improved by impregnating the shaped structures with an aqueous dispersion of a latex mixture containing as an essential component, in addition to the latex of a rubber elastomer, a finely divided isocyanate inveloped by a film-forming, protective substance, and, if desired or required, drying the shaped structures.

Such encapsulated isocyanates which are suitable for use in the process of the present invention can be prepared, for example, according to the process described in copending patent application Ser. No. 325,782 (German patent application K 48,293) and in German patent application F 40,674. According to these processes, finely dispersed isocyanates are enveloped with a film-forming, protective substance which is inert toward the isocyanate and stable at temperatures of up to about 50° C. to water or to aqueous, neutral, and, if required or desired, to alkaline and acid solutions. According to the process of copending patent application Ser. No. 325,782 (German patent application K 48,293) the isocyanates are enveloped by spraying with a solution of the protective substance in an organic solvent which does not dissolve the isocyanate and in which the isocyanate is finely dispersed. According to German patent application F 40,675, a solution of the isocyanate and of the protective substance is sprayed onto the shaped structure. The solvent used dissolves both the protective substance and the isocyanate. As film-forming protective substances for enveloping the isocyanates, a great number of compounds may be used, for example, synthetic polymeric vinyl or divinyl compounds or the derivatives thereof, synthetic polycondensation products, synthetic polyaddition products, and partially synthetic or natural polymeric substances. Particularly suitable substances are, for example, polystyrene, polyvinyl ethers, chlorinated polypropylene, polycondensation products of substituted phenol, xylene and formaldehyde, chlorinated rubber, chlorinated paraffin and the like. The enveloping substances must, of course, be compatible with the rubber elastomers with which they will come into contact later on during curing.

Furthermore, the enveloping substances must melt or soften at temperatures above 50° C. or they must at these temperatures dissolve the mechanically encapsulated isocyanate in order to enable it to diffuse diasolytically.

The process of the present invention has the special advantage that no toxic or fiber damaging compounds are to be removed during the drying process. Furthermore, the great number of usable encapsulating substances offers the possibility of selecting and using a substance which is particularly suitable for optimum adhesion to a determined rubber mixture. Thus, by selecting particularly suitable encapsulating substances, the adhesion to special types of rubber can be further improved.

A particular advantage of the aqueous latex baths of the present invention is their particularly good stability. In general, the baths are stable for 24 hours and, when using suitable isocyanates and protective substances, up to 144 hours. The impregnation in practice is thereby considerably facilitated. If, for example, immersion of the polyesters is carried out 48 hours after preparation of the latex mixture, the same values of adhesion to rubber elastomers are obtained as when using a fresh latex mixture.

Further variations of the process of the invention are possible by the fact that according to the process of copending patent application Ser. No. 325,782 (German patent application K 48,293) and German patent application F 40,674 it is possible to add to the enveloping substances or to the encapsulated polyisocyanates various additives, for example, softeners, wetting agents, dyestuffs, antioxidizers or catalysts which accelerate the reaction of the isocyanate with the compounds containing active hydrogen.

As isocyanates, there may be used aromatic, aliphatic, cycloaliphatic isocyanates or isocyanates containing a heterocycle, the isocyanates must contain at least two isocyanate groups in the molecule.

The isocyanates may be solid or liquid at room temperature. Isocyanates which generally cannot be obtained in solid form but in the form of resins or oils may also be used. As such suitable isocyanates, there may be mentioned, for example, triphenylmethane-4,4',4''-triisocyanate, diphenyl-methane-4,4'-diisocyanate, and naphthalene-1,5-diisocyanate or toluene diisocyanate. Isocyanates having more than 3 isocyanate groups in the molecule or polymeric polyisocyanates may also be used, for example, such polyisocyanates as are obtained by copolymerisation of vinylisocyanate and other vinyl compounds, by splitting off hydrogen chloride from halogeno-methyl-aryl-isocyanates by means of Friedel-Crafts catalysts (cf. French Patent 1,100,775) or by phosgenation of polymeric compounds containing primary amino groups, for example, polyamino polystyrene.

As the aqueous latex mixture, there is used in industry a dispersion which consists essentially of the latex of a rubber elastomer, resorcinol and formadehyde. Mineral or organic acids or mineral or organic, strongly basic compounds, for example mono-, di- or triethanolamine, a quaternary ammonium base, ammonia or an alkali metal hydroxide, may also be added to the mixture, depending on the pH required. Generally, the aqueous latex mixtures have a pH higher than 7, preferably pH 9–10. However, the latex mixture may also be adjusted to have an acid pH at a value of below 7, down to about pH 3, namely, if latices of rubber elastomers are to be used which are stable in the acid pH range only.

The rubber elastomer in latex form may be a natural rubber or a synthetic rubber or a derivative thereof. Particularly suitable is a tertiary copolymer of vinylpyridine, butadiene and styrene. Furthermore, there may be mentioned hevea rubber, polybutadiene, polyisoprene, butyl rubber, copolymers from butadiene and styrene or acrylonitrile, copolymers from ethylene and propylene, polychlorobutadiene, polymeric sulfochlorinated ethylene, fluorine-containing elastomers, silicone rubber types, polysulfide rubber types, cross-linked polyurethanes and the like. Mixtures of such rubber elastomers may also be used. Generally, the aqueous latex mixtures contain about 10–40 percent by weight, preferably 15–20 percent by weight, of elastomer.

Instead of resorcinol, there may also be used other mono- or polyhydric phenols, and instead of the mixture of phenol and formaldehyde, there may be used a water-soluble precondensation product of both compounds, if desired or required, together with an additional amount of formaldehyde; furthermore, instead of phenols, there may also be used other known additives, for example, casein or precondensation products of melamine or urea-formaldehyde. The quantity of resorcinol or other phenol to be added to the aqueous latex mixture can vary within wide limits; generally, it is in the range from about 1 to 3%, preferably 1.5 to 2.5%, of the weight of the aqueous latex mixture. The addition of formaldehyde is accordingly held in the range of about 0.2 to 2%, preferably 0.5 to 1.5%.

For preparing the impregnation bath of the present invention, finely divided, encapsulated polyisocyanates are introduced, with stirring, into such a latex mixture. The quantities of encapsulated isocyanate may vary within wide limits; generally, they amount to 0.1%, preferably to 0.5 to 5%, calculated on pure, free isocyanate and referred to the weight of the impregnation bath.

For improving the dispersability and the stability of the dispersion, anion-active, cation-active or non-ionogenic wetting agents and/or water-soluble protective colloids may be added. As wetting or dispersing agents, there are suitable for example, oxethylated alkyl phenols or succinic acid sulfonic esters.

Suitable substances that have an action as protective colloids are, for example, cellulose methyl ether, polyvinyl methyl ether, polyethylene glycols, polyvinyl alcohols, partially acetylated polyvinyl alcohols, polyvinyl pyrrolidone, salts of polyacrylic acids or alginic acids, polyacrylamide, proteinic substances, partially desulfurized lignisulfonates, and the like.

The aqueous latex dispersions may additionally contain other additives, for example, dyestuffs or pigments, or even small amounts of compounds having a catalytic action, for example, zinc adipate, titanium oxychloride, bismuth trichloride, dimethyl-tin dichloride, di-n-butyl-tin oxide or trialkyl phosphines or amines, which are able to accelerate the reaction of the polyisocyanates with the polyesters and the components of the latex mixture.

For impregnation, the ready mix dispersion can be applied in any desired manner onto the shaped structures made of linear polyesters, for example, fibers, fils, monofils, fabrics, bristles, foils, for example, by immersion, brushing, spraying or other processes. The quantity to be applied can vary within wide limits depending on the requirements of each particular case; generally it is about 1–15%, preferably 4–9%, calculated on the substances contained in the impregnating bath and referred to the weight of the dry polyester material. If the shaped structures of polyester thus impregnated are to be bound from all sides to rubber elastomers so as to be well adhering or if the shaped structures of polyester thus impregnated are to be stored before vulcanization, it is in general necessary to dry or to harden them before vulcanization. This drying and concurrent hardening are generally carried out at temperatures of more than 100° C. In order to accelerate this process, temperatures of 110° to 240° C. are mostly used. It is an advantage of the process of the present invention that good results are already obtained at relatively low temperatures of about 110–160° C. This possibility of using low hardening temperatures is especially advantageous for improving the adhesion to rubber of fabric hoses, because such hoses undergo undesired high shrinking tensions at high temperatures.

In the preparation of industrial articles which are coated with rubber elastomers from one side, for example, coated fabrics, inside coated hoses or other articles, a special drying and hardening process can sometimes be dispensed with. The elastomer mixture is then directly placed on the wet polyester material that has been impregnated to improve its adhesion to rubber, and the heat of more than 100° C. required for effecting the vulcanisation consecutively cause evaporation of the water, setting free of the encapsulated isocyanates, their reacting with the polyesters and the latex components and linking with the rubber elastomer by vulcanization.

The following examples illustrate the invention, but they are not intended to limit it thereto:

*Example 1*

A cord thread of endless, low shrinkage, high tenacity polyethylene terephthalate filaments (1000 den./200/2-fold; 500 Z/500 S turns per meter) was passed through an aqueous latex bath containing, per liter, 163 g. of a very finely divided copolymer of vinylpyridine, butadiene and styrene, and 27 g. of a still water-soluble resorcinol-formaldehyde precondensate, 7 g. of formaldehyde, 3 g. of ammonia and 40 g. of a 50% strength, fine powder (particle size 10 to 50µ) of a naphthalene-1,5-diisocyanate encapsulated at a ratio of 1:1 by polystyrene having a mean molecular weight of 70,000. The cord thread was then continuously dried for 60 seconds in counter-current to 220° C. hot dry air. After drying, the coating amounted to 7%. The cord thread was then imbedded into a carcass mix of the following composition:

100 parts of smoked sheets
40 parts of SRF black
2 parts of stearic acid
4 parts of pine tar
1 part of phenyl-β-naphthylamine
5 parts of zinc oxide, active
0.8 part of N-cyclohexyl-2-benzothiazol-sulfenamide
2.5 parts of sulfur and vulcanised for 45 minutes at 143° C. in a mould such that the adhesion distance of the cord in the rubber was exactly 10 mm. After storage for 24 hours, the force acting longitudinally of the cord, required to withdraw it from the rubber was measured. The static adhesive strength thus determined was 12.2 kp./cm.

When the same cord thread was immersed as described above but dried for only 45 seconds, slightly different values of the adhesive strength were obtained, when using the same naphthalene-1,5-diisocyanate and the following encapsulating substances:

|  | Kp./cm. |
|---|---|
| Polystyrene (molecular weight 70,000) | 11.8 |
| Polycondensation product of substituted phenol, xylene and formaldehyde | 11.0 |
| Polyvinyl-decahydronaphthyl ether | 11.3 |
| Chlorinated rubber (low viscosity) | 11.4 |

*Example 2*

A cone belt cord thread (100 den./200/3 x 3; 15 Z/130 S/120 Z turns per meter) of high tenacity, low shrinkage, endless polyethylene terephthalate filaments was passed through an aqueous latex bath having the composition described in Example 1. The cone belt thread was then continuously dried for different periods of time in counter-current to 220° C. hot dry air and then vulcanised into a carcass mix as described in Example 1. The determined adhesive strength was:

|  | Kp./cm. |
|---|---|
| At a drying time of 60 seconds | 13.1 |
| At a drying time of 90 seconds | 16.6 |
| At a drying time of 120 seconds | 22.0 |

*Example 3*

Cuttings of a heavy conveyer belt fabric made of low shrinkage, high tenacity, endless polyethylene terephthalate filaments, the fabric having a weight of 1560 g. per square meter, in plain weave, with 11.1 warp threads per centimeter and 4.2 weft threads per centimeter, a titer of the warp threads of 9640 den. and a titer of the weft threads of 3140 den., were treated to improve the adhesion to rubber by impregnation and squeezing in a bath having the composition described in Example 1, then pinned on a frame and dried for 18 minutes at 220° C. With these fabric cuttings and with the carcass mix described in Example 1, there were prepared under the vulcanisation conditions described in Example 2 specimen of conveyer bands with a width of 2 cm. and 3 layers of fabric. After vulcanisation, each fabric layer was 2 mm. thick and each of the 4 rubber layers was 3 mm. thick. The determination of the force required to separate the individual layers with a tearing apparatus gave the following values:

|  | Width of cutting |
|---|---|
| 1st rubber layer to 1st fabric layer, upper surface | 10.0 kp./2 cm. |
| 1st fabric layer, lower surface, to 2nd rubber layer | 8.5kp./2cm. |
| 2nd rubber layer to 2nd fabric layer, upper surface | 12.5 kp./2 cm. |
| 2nd fabric layer, lower surface, to 3rd rubber layer | 13.0 kp./2 cm. |
| 3rd rubber layer to 3rd fabric layer upper surface | 9.5 kp./2 cm. |
| 3rd fabric layer, lower surface, to 4th rubber layer | 12.0 kp./2 cm. |

When the drying time of the treated fabric cuttings was increased to 25–30 minutes, the values of the adhesive strength were increased by about double the above-indicated values.

*Example 4*

A fabric hose prepared from a 200 thread yarn of high tenacity, low shrinkage, endless polyethylene terephthalate threads having a titer of 1000 den., like those used by the fire-brigades, having in flat state a width of 86 cm. was impregnated by immersion into a bath having the composition given in Example 1 and then squeezed. A rubber hose which in flattened state had a width of 80 mm. and consisted of a synthetic rubber of 80% by weight of a copolymer of butadiene and acrylonitrile and 20% by weight of polychloroprene was introduced into the still wet fabric hose and the whole structure was vulcanised together for 25 minutes by internal heating with steam having 3 atmosphere gage pressure corresponding to a temperature of 142° C. After storage for 24 hours at room temperature, test specimen were cut in longitudinal and transversal direction from this vulcanised hose and the adhesive strength was determined according to the Swedish Standard requirement tests. In these tests, the inner rubber layer was cut up to the fabric and the rubber in direction of the plane of the fabric was loaded with a weight of 3.6 kg. and then the time needed for tearing off a distance of 65 mm. was determined. In each of the tests, this time was in longitudinal as well as in transversal direction no less than 300 seconds, so that the requirements of the Swedish standards, namely a tearing time of at least 60 seconds, is exceeded more than 5 times.

*Example 5*

A cord thread of high tenacity, low shrinkage, endless polyethylene terephthalate filaments (1000 den./200/2-fold; 500 Z/500 S turns per meter) was passed through an aqueous latex bath containing, per liter, 163 g. of a very finely dispersed copolymer of vinylpyridine, butadiene and styrene,
27 g. of a still water-soluble resorcinol-formaldhyde precondensate,
7 g. of formaldehyde,
3 g. of ammonia,
2.5 g. of polyvinyl methyl ether, and
25 g. of a fine powder (particle size 10–50μ) consisting of 4 parts by weight of naphthylene-1, 5-diisocyanate as core substance and 1 part by weight of polystyrene having a molecular weight of 70,000 as protective substance.

The cord thread was then continuously dried for 75 seconds in counter-current to 220° C. hot dry air. After drying, the coating amounted to 7.8%.

After vulcanisation into the carcass mix described in Example 1, the static adhesion was 11.8 kp./cm.

When the same cord thread was immersed 72 hours after preparation of the latex mixture, dried and vulcanised under the conditions indicated above, the determined adhesive strength was 11.1 kp./cm.

We claim:
1. Method for improving the adhesion of shaped structures made of polyesters to rubber elastomers, which comprises impregnating the shaped structures with an aqueous dispersion of a latex mixture containing as essential component in addition to the latex of a rubber elastomer, a finely divided organic compound having a plurality of isocyanate groups, the individual particles of said organic compound being encapsulated by a film-forming compound stable to water at temperatures of up to 50° C., at which temperature the encapsulating film melts or the organic compound diffuses through said film.
2. The method as claimed in claim 1, wherein the aqueous dispersion of the latex mixture additionally contains a member selected from the group consisting of resorcinol, formaldehyde, a water-soluble condensate of these compounds and a mixture of this condensate with formaldehyde.
3. The method as claimed in claim 1, wherein the aqueous dispersion of the latex mixture contains 0.1–15% by weight of the organic compound having a plurality of isocyanate groups.
4. The method as claimed in claim 1, wherein the aqueous dispersion of the latex mixture additionally contains a member selected from the group consisting of non-ionic, anionic and cationic wetting and dispersing agents.
5. The method as claimed in claim 1, wherein the aqueous dispersion of the latex mixture additionally contains a water-soluble protective colloid.
6. The method as claimed in claim 1, wherein the aqueous dispersion of the latex mixture additionally contains an antioxidizer.
7. A method for improving the adhesion of shaped structures of linear polyesters to rubber elastomers, which comprises impregnating the shaped structures with an aqueous dispersion of a latex mixture containing as essential component in addition to the latex of a rubber elastomer, a finely divided organic compound having a plurality of isocyanate groups the individual particles of said organic compound being encapsulated by a film-forming compound which is stable to water at temperatures of up to 50° C., and drying the impregnated structures at a temperature of from 100° to 240° C.
8. A method for improving the adhesion of shaped structures of linear polyesters to rubber elastomers, which comprises impregnating the shaped structures with an aqueous dispersion of a latex mixture containing from 10 to 40% by weight of a latex of a rubber elastomer, from 1 to 3% by weight of resorcinol, from 0.2 to 2% by weight of formaldehyde, and a finely divided organic compound having a plurality of isocyanate groups the individual particles of said organic compound being encapsulated by a film-forming compound stable to water at temperatures of up to 50° C. and being present, in an amount of 0.1 to 15% by weight, calculated on the pure free isocyanate compound, and drying the impregnated structures at a temperature of from 100° to 240° C.
9. Shaped structures of linear polyesters having an improved adhesion to rubber elastomers and prepared by the process of claim 8.

References Cited by the Examiner
UNITED STATES PATENTS

| | | | |
|---|---|---|---|
| 2,938,823 | 5/1960 | Salem et al. | 161—190 |
| 2,990,313 | 6/1961 | Knowles et al. | 161—190 |
| 2,994,671 | 8/1961 | Thompson | 161—190 |
| 3,024,209 | 3/1962 | Ferrigno | 260—2.5 |

MURRAY TILLMAN, *Primary Examiner.*

J. C. BLEUTGE, *Assistant Examiner.*